United States Patent
Chuang (10) Patent No.: US 7,590,546 B2
(45) Date of Patent: Sep. 15, 2009

(54) SYSTEM AND METHOD FOR RENTING OR PURCHASING GOODS VIA A COMMUNICATIONS NETWORK

(76) Inventor: Thomas C. Chuang, 2201 Laguna St., #408, San Francisco, CA (US) 94115

( * ) Notice: Subject to any disclaimer, the term of this patent is extended or adjusted under 35 U.S.C. 154(b) by 1104 days.

(21) Appl. No.: 10/691,286

(22) Filed: Oct. 22, 2003

(65) Prior Publication Data
US 2005/0091069 A1    Apr. 28, 2005

(51) Int. Cl.
*G06Q 99/00* (2006.01)
(52) U.S. Cl. ......................................................... 705/1
(58) Field of Classification Search .................. 705/14, 705/26, 1
See application file for complete search history.

(56) References Cited

U.S. PATENT DOCUMENTS

| | | | | |
|---|---|---|---|---|
| 4,458,802 A | * | 7/1984 | Maciver et al. | 194/205 |
| 4,866,661 A | * | 9/1989 | de Prins | 235/382 |
| 5,143,193 A | * | 9/1992 | Geraci | 194/212 |
| 5,664,110 A | * | 9/1997 | Green et al. | 705/26 |
| 6,055,314 A | * | 4/2000 | Spies et al. | 380/228 |
| 6,460,076 B1 | * | 10/2002 | Srinivasan | 709/219 |
| 6,584,450 B1 | * | 6/2003 | Hastings et al. | 705/26 |
| 6,655,580 B1 | * | 12/2003 | Ergo et al. | 235/375 |
| 2002/0046085 A1 | * | 4/2002 | Rochon et al. | 705/14 |
| 2004/0128250 A1 | * | 7/2004 | Fox et al. | 705/52 |
| 2004/0158871 A1 | * | 8/2004 | Jacobson | 725/115 |

* cited by examiner

*Primary Examiner*—Dennis Ruhl
(74) *Attorney, Agent, or Firm*—IP Law Office of Thomas Chuang (57) ABSTRACT

The present invention provides a computer implemented method for offering items for sale or rent. The method includes providing a user with the choice of renting or purchasing an item. The rental price and purchase price for the item are displayed. A user command to rent an item is received.

4 Claims, 10 Drawing Sheets

Rental Queue 300

DVDs Checked Out — 302

| Movie Title | Category | Shipped | Estimated Arrival Date | Purchase New | Purchase Used |
|---|---|---|---|---|---|
| 1 Carlito's Way | Drama | 10/08/03 | 10/10/03 | ☐ $29.99 | ☐ $9.99 |
| 2 The Good Thief | Thrillers | 10/09/03 | 10/11/03 | ☐ $29.99 | ☐ $12.99 |
| 3 The Matrix | Sci-Fi | 10/09/03 | 10/11/03 | ☐ $19.99 | ☐ $8.99 |

308  310  312  314

DVDs in Your Queue — 304

| Movie Title | Category | Availability 330 | Remove | Purchase New | Purchase Used |
|---|---|---|---|---|---|
| 1 The Quiet American | Drama | Short Wait | ☐ | ☐ $29.99 | ☐ $19.99 |
| 2 Roger & Me | Documentary | Now | ☐ | ☐ $19.99 | ☐ $9.99 |
| 3 Matrix: Reloaded | Sci-Fi | Long Wait | ☐ | ☐ $29.99 | ☐ $19.99 |
| 4 The Ice Storm | Drama | Now | ☐ | ☐ $24.99 | ☐ $12.99 |

316                     328   320  322  324  326

[ UPDATE YOUR QUEUE ] — 318

Figure 3A (CONT. FROM FIG. 3A)

DVDs Awaiting Release ~306

| Movie Title | Category | Release | Remove | Purchase New | Purchase Used |
|---|---|---|---|---|---|
| City of God | Foreign | Dec. 2003 | ☐ | ☐ $29.99 | ☐ See pricing |
| Lilya 4-Ever | Foreign | Feb. 2004 | ☐ | ☐ $29.99 | ☐ See pricing |
| | | | 338 | 332  324 | 336 |

| UPDATE AWAITING RELEASES | ~340 |

You have purchased The Boxer for $16.99. You will receive the jewel case in a few days.

If you do not wish to receive the jewel case, the purchase price will be $14.99.

— 402

☑ Do not send jewel case

701 You have elected to purchase a used copy of Punch Drunk Love. This title has not been released yet. The estimated release date is March 2003.

Please select a purchase price and date on which you would like a used copy sent.

702
- ☐ March 2003      $25.99
- ☐ April 2003      $22.99
- ☑ May 2003      $15.99

704 ☑ I would still like to receive a rental copy of Punch Drunk Love*.

\* By electing to purchase Punch Drunk Love, you will be given priority in receiving a rental copy when the title is released.

SYSTEM AND METHOD FOR RENTING OR PURCHASING GOODS VIA A COMMUNICATIONS NETWORK

TECHNICAL FIELD

The present invention relates to conducting commercial transactions, and in particular, to systems and methods related to the rental and sale of goods.

BACKGROUND

The Internet, and World Wide Web in particular, is increasingly being used to conduct electronic commerce. Many web servers have been developed through which vendors can sell goods. Goods (also referred to herein as items or products) can include both downloadable items (e.g., music) that are delivered electronically to the purchaser over the Internet and items (e.g., digital video disks and books) that are delivered through conventional distribution channels (e.g., a common carrier).

A server computer system may provide an electronic version of a catalog that lists the goods that are available. A user, who is a potential purchaser, may browse through the catalog using a browser on a client computer and select various goods that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. Alternatively, the purchaser-specific order information may have been previously entered and stored by the server computer system. The server computer system then typically confirms the order by sending a confirming web page to the client computer system and schedules shipment of the items.

The World Wide Web is also being used to conduct other types of commercial transactions besides the sale of goods. For example, some server computer systems have been developed to rent goods such as digital video disks (DVDs) electronically. Instead of purchasing goods, the user browses through the electronic catalog and selects various goods to be rented. The server system maintains a record of goods that have been rented by a user. When a user returns goods that have been rented, the goods are checked in such that the server computer system knows that goods have been returned. For example, a rented good may have a bar code identifier that is scanned when the good is returned. Some server computer systems have been developed to allow users to download digital content such as music. However, since free file sharing networks exist in alternative, it has been difficult to convince file sharers to rent or purchase downloadable content.

Although systems exist which allow users to either rent or buy goods, in the prior art systems do not provide a convenient, efficient, and advantageous mechanisms to do both. Thus, there is a need for improved systems that allow a user to both rent and purchase goods.

SUMMARY OF THE INVENTION

The present invention provides a solution to the needs described above through an inventive system and method for renting or purchasing a product.

The present invention provides a computer implemented method for offering items for sale or rent. The method includes providing a user with the choice of renting or purchasing an item. The rental price and purchase price for the item are displayed. A user command to rent an item is received.

The present invention further provides a computer implemented method for offering items for sale or rent. The method includes providing a user with the choice of renting or purchasing an item. A used item purchase price for the item is generated and displayed. A user command to rent an item is received. A user command to purchase the item is subsequently received.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an inventive system and method for renting or purchasing goods (also referred to herein as items or products).

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

For example, the specific features and advantages of the invention may vary depending on the type and form of goods being rented and sold. For example, in an embodiment where physical good form the web site assets (also referred to herein as inventory), acquiring sufficient inventory and eliminating excess inventory are addressed by the invention. In an embodiment where downloadable content is rented and sold, the present invention addresses unlawful free file sharing and encourages rental and purchase of downloadable content.

The present invention enables users to choose between purchasing and renting items such as digital video disks. In an environment where users typically rent items, the present invention offers users a convenient mechanism by which to purchase items. For example, the user may choose to purchase an item after renting the item or may choose to purchase the item rather than wait for a rental. In an environment where users typically purchase items, the present invention offers users a convenient mechanism by which to rent items. For example, users may wish to try the items before deciding on making a purchase. By offering a rental price lower than a purchase price, a user is encouraged to rent an item potentially leading to an eventual purchase of the rented item.

The present invention allows system owners to leverage off of existing rental or sales to generate additional revenues and increase user satisfaction. In an embodiment where a system owner typically rents items, the present invention provides for increased revenues through the sale of items. In particular, for items with a high initial rental demand the present invention provides an efficient mechanism by which used items are sold when rental demand decreases. The purchase price for the used items is adjusted to reflect either current or predicted demand as a function of time. Furthermore, in the past system owners have been hesitant to purchase too many items to meet initial rental demand because the system owners were left with too many items once demand drops. As a result, users must often wait to rent an item during the period of high demand because the system owner has purchased a limited number of copies. The present invention allows system owners to improve their rental service by purchasing more items to meet initial demand while still avoiding the problem of excess inventory.

The various system features and methods of the invention will now be described in the context of a rental and sales service that is used to rent and sell digital video disk (DVD) titles to users of a web site. In a further embodiment discussed below, the invention is described in the context of a rental and sales service that is used to rent and sell downloadable music. As will be recognized to those skilled in the art, the disclosed systems and methods can also be used to rent and sell other types of items. By way of example and not limitation, the disclosed system and methods can also be used to for CDs, books, downloadable content, household items, and other goods.

Throughout the description, reference will be made to various implementation-specific details of the rental and sales services and an example web site implementing the services. These details are provided in order to fully illustrate preferred embodiments of the invention, and not to limit the scope of the invention.

The web site of the present invention includes functionality for allowing users to search, browse, rent, and purchase from an online catalog of DVDs. Using a rental queue feature of the site, users can add and remove DVDs from a rental queue which is maintained over multiple sessions. Selected DVD titles are shipped to the user by the web site (physical actions are performed by a person associated with the web site). The user returns the DVD title after viewing by shipping it back to the website for check in. In one embodiment, for convenience of the user, shipping postage in both directions is paid by the website.

The rental queue is a data structure and associated code which keeps track of items that have been selected by a user for rental. The rental queue is divided into three separate lists based on the status of the DVD selected for rent. A "Checked Out" list keeps track of DVDs in possession of a web site user or in transit between the user and website. A "DVDs in Queue" ordered list keeps track of DVDs to be shipped to the user when a DVD on the "checked out" list is returned to the web site. An "Awaiting Release" list keeps track of DVDs the user has selected that have not been released yet.

In operation, a user browses through the web site viewing profiles of DVDs available. The profiles include the DVD title, a brief description of the plot, and identify the director and primary actors in the movie. The web site may offer a variety of features that enable the user to identify desired DVD titles. For example, DVD titles may be searchable by category of movie. Such categories may include drama, foreign, romantic comedies, and action. The web site may identify other movies rented by other users who also rented the DVD title the user is currently browsing. Users may also search for and browse DVD titles by actor, director, format (e.g., screen display options and sound options), and language. The web site may display a cumulative rating by all users for displayed DVD titles. The web site may further allow searching for new releases, top rentals, and critics picks. The profile may also include reviews by critics or other users.

The user may select to "rent" the DVD, which will place the DVD in the user's queue. The user may view his or her queue at any time. The user is allotted a pre-determined number of DVDs to be checked out at one time. In an embodiment of the invention, the user pays a monthly fee which allows the user to rent as many DVD titles as desired, limited by the number of DVDs allotted to be checked out at one time. When a DVD from the rental queue is shipped to the user, both the checked out list and rental queue list are updated. The shipped DVD is placed on the checked out list and removed from the rental queue. The remaining DVDs in the rental queue are renumbered, with the next DVD to be shipped displayed as first in the rental queue. A user can modify the contents of the rental queue at any time. For example, the user may choose to re-order the rental queue to prioritize selected DVDs over other DVDs currently on the queue. The user may also select to remove DVDs from the rental queue. When a DVD on the upcoming release list becomes available, it is removed from the upcoming release list and placed at the bottom of the rental queue.

The web site may also implement a recommendation service for recommending DVD titles to users. Users interactively rate DVDs they have viewed on a scale of one star to five stars to create personal item ratings profiles. The recommendation service applies filtering techniques to these profiles to generate personal recommendations. Recommendation systems include content-based systems and systems that do not use item-to-item mappings. Personal recommendations may be utilized as a price modification factor in determining the purchase price of a DVD.

The web site implements a sales service which operates in accordance with the invention to sell used and new DVDs in conjunction with the rental service. The sales service is used to sell both used titles and new titles. An aspect of the sales service is that it generates a purchase price for various DVDs in the user's queue which are designed to encourage user purchases while maximizing rental use of the copy prior to purchase. Generation of purchase prices is updated periodically in consideration of price modification factors.

A user may select to purchase a new copy of any DVD title while browsing the web site. The user may also select to purchase a new copy of any DVD title that the user placed in his or her rental queue. The user may also purchase used DVD titles that the web site has previously used for rentals. The user may purchase a used copy of any DVD title while browsing the site. The user may also select to purchase a used copy of any DVD title that the user placed in his or her rental queue.

The purchase price for new DVDs may be set in a variety of ways. In one embodiment, the purchase price may be set at the MSRP. In other embodiments, the new purchase price may be set based on an evaluation of prices at other online retailers. A price comparison software application may be utilized to compare prices.

In accordance with an aspect of the invention, the used purchase price of DVDs in the user's queue are determined by identifying a baseline purchase price and applying weighted price modification factors to calculate a display offer. For example, in one embodiment described below, the sales service determines whether there is currently an excess capacity of stocked DVDs relative to user rental patterns. Similarly, a user specific price modification factor may be applied, such as a frequent buyer discount. Applying price modification factors produces purchase prices that are correlated to the likelihood that a user will select to purchase the DVD while balancing the web sites desire to reduce excess inventory.

Figure 1:
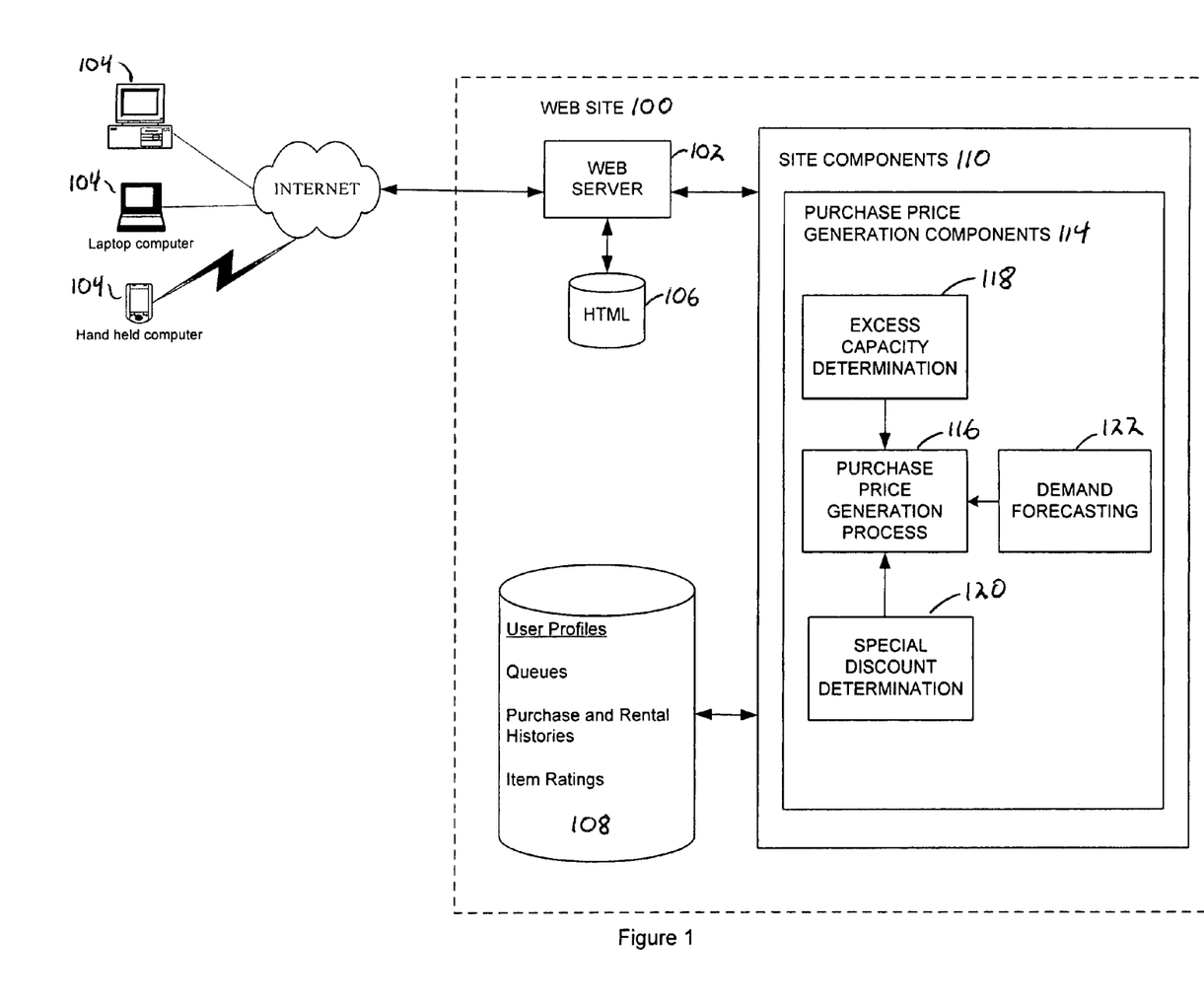
FIG. 1 illustrates a web site which implements a rental and sales service in one embodiment of the invention, and illustrates the flow of information between components

FIG. 1 illustrates the basic components of the rental and sales web site 100, including the components used to implement the sales service. The arrows in FIG. 1 show the general flow of information that is used by the sales service. As illustrated by FIG. 1, the Web site 100 includes a Web server application 102 ("Web server") which processes HTTP (Hypertext Transfer Protocol) requests received over the Internet from user computers 104. The computers may include a central processing unit, memory, input devices (e.g., keyboard and pointing device), output devices (e.g., display devices), and storage devices (e.g., disk drives). Embodiment of computer 104 may include desktop PCs, notebook computers, and handheld computers. Computer 104 may connect to the internet using a wired or wireless interface. The memory and storage devices are computer-readable media that may contain computer instructions that implement the auction system. The computers 104 may use a browser to access the web pages via the Internet.

The Web server 104 accesses a database 106 of HTML (Hypertext Markup Language) content which includes product information pages and other browsable information about the various products of the catalog. The "items" that are the subject of the sales service are the titles that are represented within this database 106.

The Web site 100 also includes a "user profiles" database 108 which stores account-specific information about users of the site. In particular, the user profiles include user specific rental queues. Because a group of individuals can share an account, a given "user" from the perspective of the web site may include multiple actual users. As illustrated by FIG. 1, the data stored for each user may include one or more of the following types of information (and additional types not shown) that can be used to generate purchase prices in accordance with the invention: (a) the user's queue, (b) the user's rental and purchase history, and (c) the user's item ratings profile.

As depicted by FIG. 1, the Web server 102 communicates with various site components 110. These components 110 include, for example, a search engine and associated database for enabling users to interactively search the catalog for particular items. Also included within the components 110 are various order processing modules for accepting and processing rental and sales orders, and for updating the rental and purchase histories of the users.

The components 110 also include a queue manager which manages the queue update process. The queue manager adds and removes items from the users' queue based on the actions of the respective users. (The term "process" is used herein to refer generally to one or more code modules that are executed by a computer system to perform a particular task or set of related tasks.)

The components 110 also include purchase price generation components 114 that are used to implement the site's various sales services. Purchase prices generated by the purchase price generation process 116 are returned to the Web server 102, which incorporates the purchase prices into personalized Web pages transmitted to users. The purchase price generation process 116 utilizes excess capacity determination processes 118, special discount determination processes 120, and demand forecasting processes 122.

The purchase price generation components 114 include a purchase price generation process 116 which implements the above-described sales service. Users place DVD items on their individualized rental queue during ordinary browsing of the site. The queue manager and order processing modules place the selected items on the user's rental queue on the user profile database.

The various processes of the sales services may run, for example, on one or more Unix or NT based workstations or physical servers of the Web site 100. The user's queue is preferably stored as a data structure designed to permit efficient look-up and modification.

The general sequence of steps that are performed by the purchase price generation process 116 to generate a set of purchase prices will now be described with reference to FIGS. 5A and 5B. This process, as well as the queue update process depicted by FIG. 6, is intended to illustrate, and not limit, the scope of the invention.

For each DVD item on the queue list, the web site calculates a used DVD purchase price to display to the user when the user is viewing the queue list. The FIG. 5A and FIG. 5B processes are invoked prior to or in real-time in response to selection by a user to rent a DVD. The purchase price generated by the price generation process is displayed to the user when the user selects to view the user queue. In an instantaneous purchase scenario, where a user selects to make a purchase while browsing a DVD title web page, the purchase price is generated prior to or instantaneously when the user selects to view a DVD title web page, and displayed with the DVD title web page.

Any of a variety of other methods can be used to initiate the price generation process and to display the purchase price to the user. For example, the purchase prices can automatically be generated periodically for select DVDs and sent to the user by e-mail, in which case the e-mail listing may contain hyperlinks to the DVD title web pages of the DVD's being offered for sale.

Figure 5A:
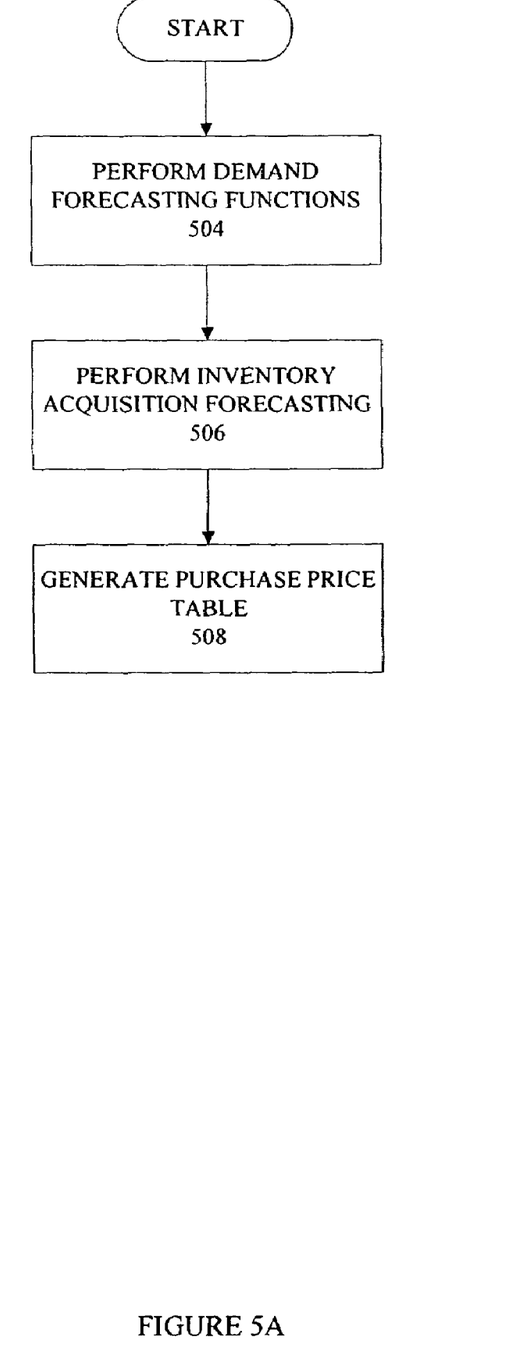
FIG. 5A illustrates a sequence of steps performed by the price generation process to determine the purchase price of a product awaiting release.
Figure 6:
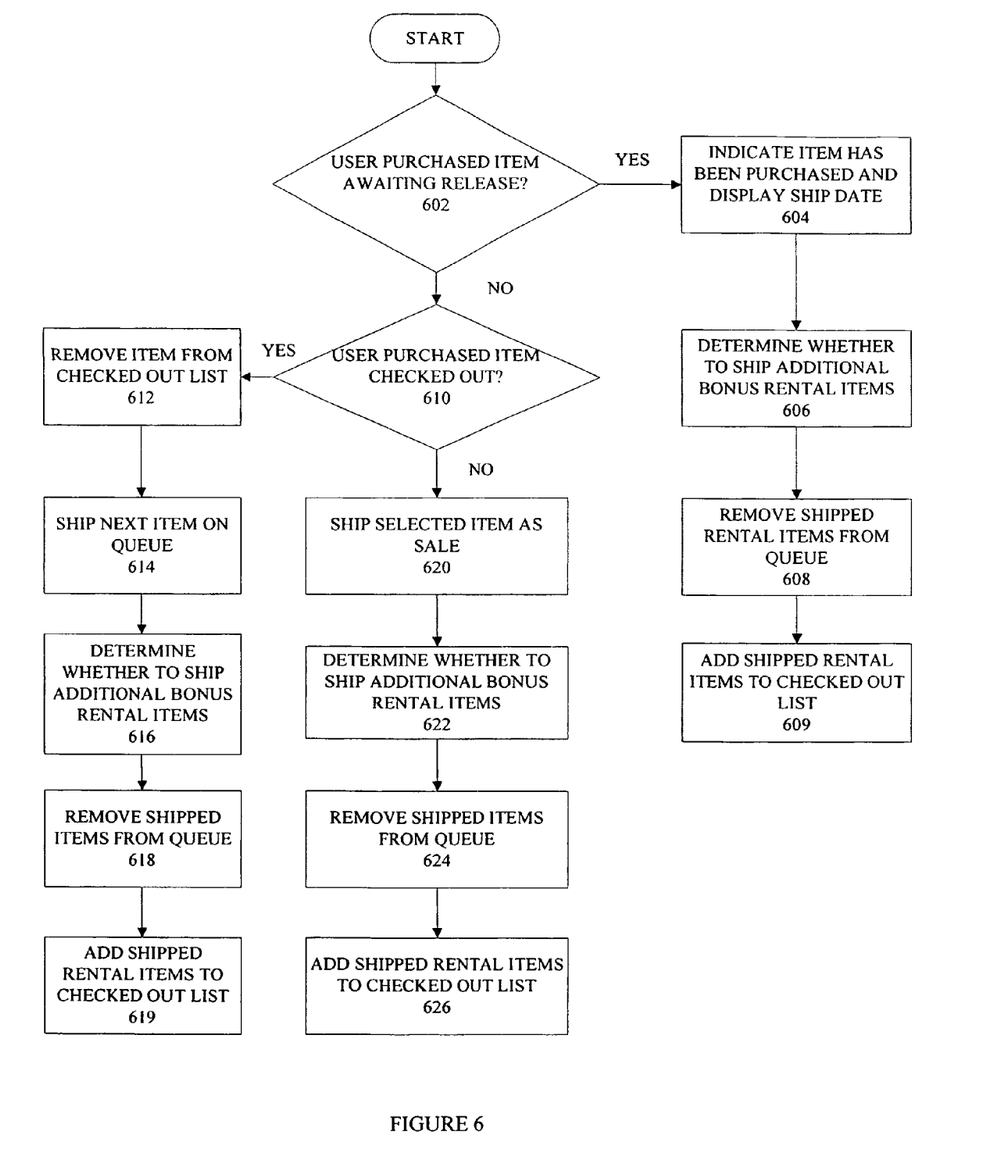
FIG. 6 illustrates a sequence of steps updating the user's rental queue web page following purchase of a product.

FIG. 5A illustrates the price generation process for when a user selects to purchase a used DVD title that is still awaiting release. At step 504 the service performs demand forecasting functions. The likely rental pattern as a function of time lapsed from the release date is forecast. In one embodiment, the forecast may be based on box office receipts for the DVD title and rental patterns of prior DVD titles with similar box office receipts. One of ordinary skill in the art will recognize that a variety of other techniques can be utilized to forecast the depreciating rental demand, including techniques such as mathematical curve fitting techniques.

At step 506, the inventory acquisition is forecast or determined. This forecast may represent the actual number of copies of the DVD title the web site will acquire or an estimation of the number of copies of the DVD title the web site will acquire based on previous purchasing plans. At step 508, the service generates a purchase price table. The purchase price table is a list of purchase prices mapped to dates after the release date of the DVD title. With increased lapsed time from the release date, the purchase price is lowered to reflect decreased rental demand. Furthermore, the web site can utilize the number of purchased DVD titles to modify the inventory acquisition forecast at step 508 in a feedback loop. As more used copies of a DVD title are purchased in advanced, the web site may increase the number of new copies acquired. Acquisition of additional copies is used to meet initial rental demand. The user is offered the option of receiving a rental copy of the DVD title in addition to receiving the purchased DVD. Thus, if the user selects to purchase a lower priced DVD by waiting for a longer period after the release date, the user may have the opportunity to view a rental copy. To encourage DVD title purchases, the web site increases the user priority in receiving rental copies of the DVD title. When user demand exceeds assets, the status of a DVD title in the user's queue is designated a wait status. Wait statuses include short wait, long wait, or very long wait. The web site assigns a user priority to determine the order of the users to receive copies that become available. As a result, the web site encourages the sale of used copies of DVD titles, but after the initial high rental demand has subsided.

The purchase price generation process lowers the purchase price for a DVD title as the predicted rental demand decreases. The web site thereby generates additional revenue by encouraging the sale of used DVD titles, but at a time when demand has decreased and in an amount associated with the decreased demand. Additional revenue is generated while reducing excess inventory. Furthermore, the web site tracks the number of future used copies purchased. The web site can modify its initial inventory acquisition, purchasing additional copies of DVD titles to meet initial demand knowing that it has already pre-sold a certain number of used copies. The present invention thus improves the rental service by providing more rental copies while generating revenue and eliminating future excess inventory. Thus, the present invention addresses typical problems a rental web site encounters where the web site does not acquire enough rental copies to meet initial demand resulting in long customer waits or the web site acquires too many copies to meet initial demand and is left with extra copies after demand falls. Furthermore, the present invention advantageously assists in determining the number of initial copies to purchase.

Figure 7:
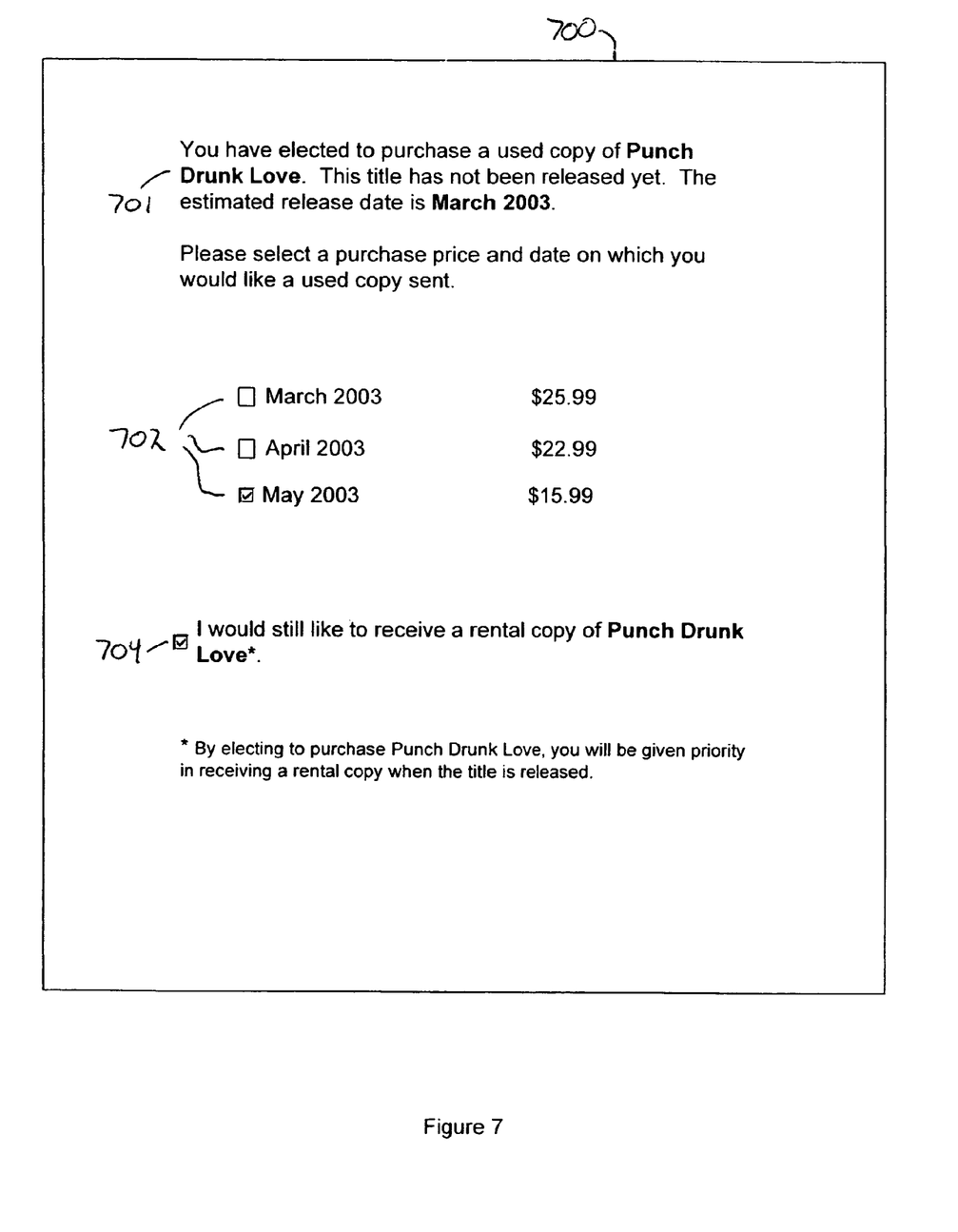
FIG. 7 illustrates the general form of a web page through which a user may select the purchase price and shipment date for a product awaiting release.

Referring to FIG. 7, a sample web page illustrating a general form of a web page through which a user may select the purchase price and shipment date for a product awaiting release is shown. The user is informed by text 701 that he or she has elected to purchase a used copy of a DVD title awaiting release and is informed of the estimated release date. The user is presented with options 702 to select from that set forth different purchase prices based on date lapsed from the release date. If the user selects to check box 704, the user will still receive a rental copy of the purchased DVD title. The user is given priority in receiving rental copies of the DVD title when the DVD title is released.

Figure 5B:
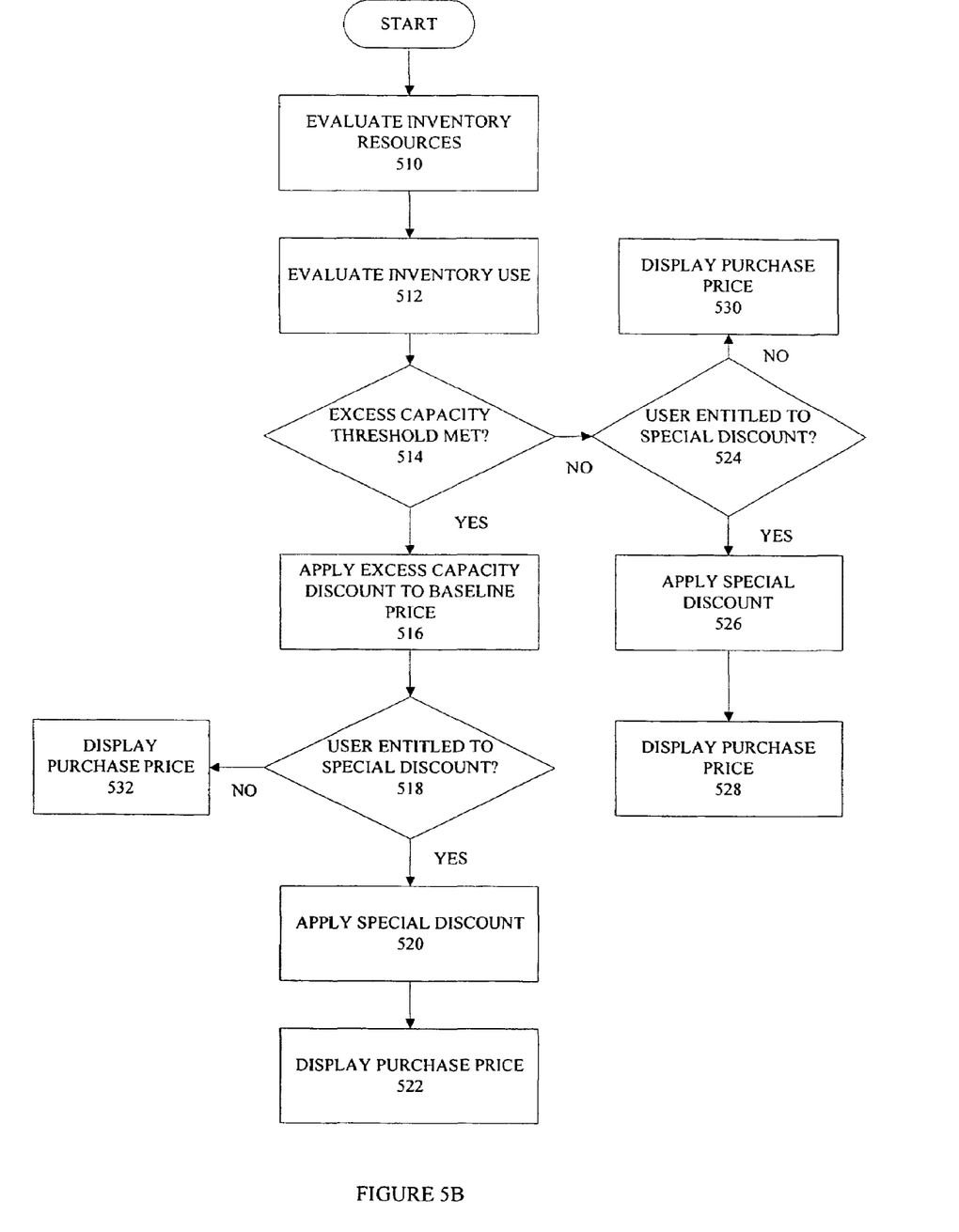
FIG. 5B illustrates a sequence of steps performed the price generation process to determine the purchase price of a product currently checked out or on the rental queue.

FIG. 5B illustrates the price generation process for when a user selects to purchase a used DVD title that is in the user's checked out list or rental queue. The web site begins with a baseline used price for the DVD title that has been previously set. In an embodiment of the invention, the baseline used price for a DVD title is the wholesale price paid by the web site plus the desired profit. In another embodiment of the invention, the baseline used price may be determined in part by current market rates for the used DVD title. One of ordinary skill in the art will recognize that numerous methods may be used to set the baseline used price.

At step 510, the web site evaluates the inventory resources. For the DVD title at issue, the web site determines the number of copies owned by the web site. At step 512, the web site evaluates the inventory use. The rental pattern, both historical and current, of the DVD title across all users is evaluated. One output of step 512 is the peak number of copies of the DVD title checked out and required to be shipped from user queues at a give time.

At step 514, the web site determines whether an excess capacity threshold has been met. The excess capacity threshold is a previously calculated variable that the web site utilizes to determine whether an excess capacity condition exists. In an embodiment of the invention, an excess capacity condition for a DVD title exists when the total number of copies of the DVD contained in the inventory resources exceeds inventory use. Various formulations can be used to determine whether an excess capacity exists. For example, the web site may set an excess capacity threshold that tolerates a predetermined number of short wait or long wait situations while still returning an excess capacity determination.

If yes at step 514, at step 516, an excess capacity discount price modification factor is calculated and applied to the baseline used price. In an embodiment of the invention, the modification factor reduces the baseline used price by 10 to 30 percent. In an embodiment of the invention, the reduction is proportional to the extent of excess capacity. At step 518, the web site determines whether the user is entitled to a special discount.

If no at step at 518, the purchase price generated at step 516 is displayed. If yes at step 520, a special discount modification factor is calculated and applied to the purchase price generated at step 516. At step 522, the purchase price generated at step 520 is displayed.

If no at step 514, at step 524 the web site determines whether the user is entitled to a special discount. If no at step at 524, the baseline used price is displayed at step 530. If yes at step 524, at step 526 a special discount modification factor is calculated and applied to the baseline used price. At step 528, the purchase price generated at step 528 is displayed.

If the user purchased a used copy of a DVD title currently in the user's rental queue, and the current status of the DVD title is in wait status, the web site gives the user priority in receiving a copy of the DVD title as it becomes available after return by another user. The web site thereby encourages purchases by allowing the user to receive a purchased copy earlier than a rental copy.

In the embodiment depicted in FIG. 5, the service determines whether the user is entitled to a special discount. The special discount may be based on a variety of factors, both objective and subjective to the user. For example, the special discount may be based on one or more of the following factors: (a) the volume of user purchases, (b) whether the user belongs to a higher tier rental service plan, (c) the service is running a promotion to encourage purchases, (d) the user has purchased a predetermined number of DVD titles, or (e) whether an excess capacity discount has been applied. When more than one factor is used, each factor may be weighted differently in determining whether the user is entitled to the special discount. In an embodiment of the invention, the special discount is between 10 and 25 percent off the purchase price. One of ordinary skill in the art will recognize that other factors and discount pricing may be employed by the web site.

Referring to FIG. 6, the process for updating the rental queue following a user purchase of an item on the rental queue is illustrated. In an embodiment of the invention, the items are DVDs. At step 602, the web site determines whether the user purchased a DVD awaiting release. If yes, at step 604 the web site updates the rental queue to indicate in the DVD awaiting release list that the DVD has been purchased and displays the approximate shipment date. The web site may also send a web page to the user confirming the title of the DVD purchased and the estimated shipment date.

At step 606, the web site determines whether to ship additional bonus rental DVDs from the user's rental queue as a reward for making a purchase. Shipment of bonus rental DVDs provides users with an incentive to make purchases with incremental additional cost to the web site. At step 608, the web site removes any shipped bonus rental DVDs from the rental queue. At step 609, the shipped bonus rental DVDs are placed in the checked out list. When the purchased DVD title becomes available, the web site ships the purchased DVDs and removes the DVD from the DVD awaiting release list. The present web site is advantageous because given the web site pricing plan, shipping bonus rental DVDs does not significantly increase costs to the web site, yet provides increased user satisfaction. The increased user satisfaction encourages future purchases.

If no at step 602, at step 610 the web site determines whether the user purchased a DVD on the currently checked out list. If yes, at step 612, the web site removes the DVD from the checked out list. At step 614, the web site ships the next rental DVD on the user's rental queue. At step 616, the web site determines whether to ship additional bonus rental DVDs from the user's rental queue. At step 618, the web site removes any shipped bonus rental DVDs from the rental queue. At step 619, the shipped bonus rental DVDs are placed in the checked out list. The user is informed if they will be receiving additional bonus rental DVDs. In a further embodiment of the invention, as a purchase reward the web site may increase the user priority of the user in receiving DVD rentals on their queue that have a wait status availability. The user priority refers to the order in which high demand DVDs are shipped to users when they become available. The web site may utilize a variety of algorithms to calculate the user priority of users, and include such factors as whether the user has other DVD titles in his queue.

If no at step 610, the user has selected to purchase a DVD currently on the user's rental queue. At step 620, the web site ships the selected DVD title as a sale DVD. If the user selects a DVD title currently in wait status, the user priority of the user is increased. At step 622, the web site determines whether to ship additional bonus rental DVDs as a bonus. At step 624, the purchased DVD and any shipped bonus rental DVDs are removed from the rental queue. At step 626, shipped bonus rental DVDs are added to the checked out list. An updated web page is sent to the user.

In the embodiment depicted in FIG. 6, the web site determines whether to ship to the user additional rental DVDs as a bonus for purchasing a DVD. In one embodiment, additional bonus rental DVDs are always shipped to the user who has made a purchase. In a further embodiment, bonus rental DVDs are shipped whenever a user has made a certain number of purchases or when user rental activity (as determined by rate of return of rental copies) has been low.

The present invention addresses typical problems a web site renting goods encounters where it either does not acquire enough rental copies to meet initial demand resulting in long customer waits or it acquires too many copies to meet initial demand and is left with extra copies after demand falls. The web site advantageously promotes the sale of used rental copies by offering additional purchase price discounts when there is an excess capacity of inventory, special discounts based on a variety of factors, bonus reward DVD rentals, and increasing user priority in receiving wait status DVD rentals. The web site thereby generates additional revenue by promoting the sale of used DVD titles, with promotion increasing when rental demand is decreased.

Figure 2:
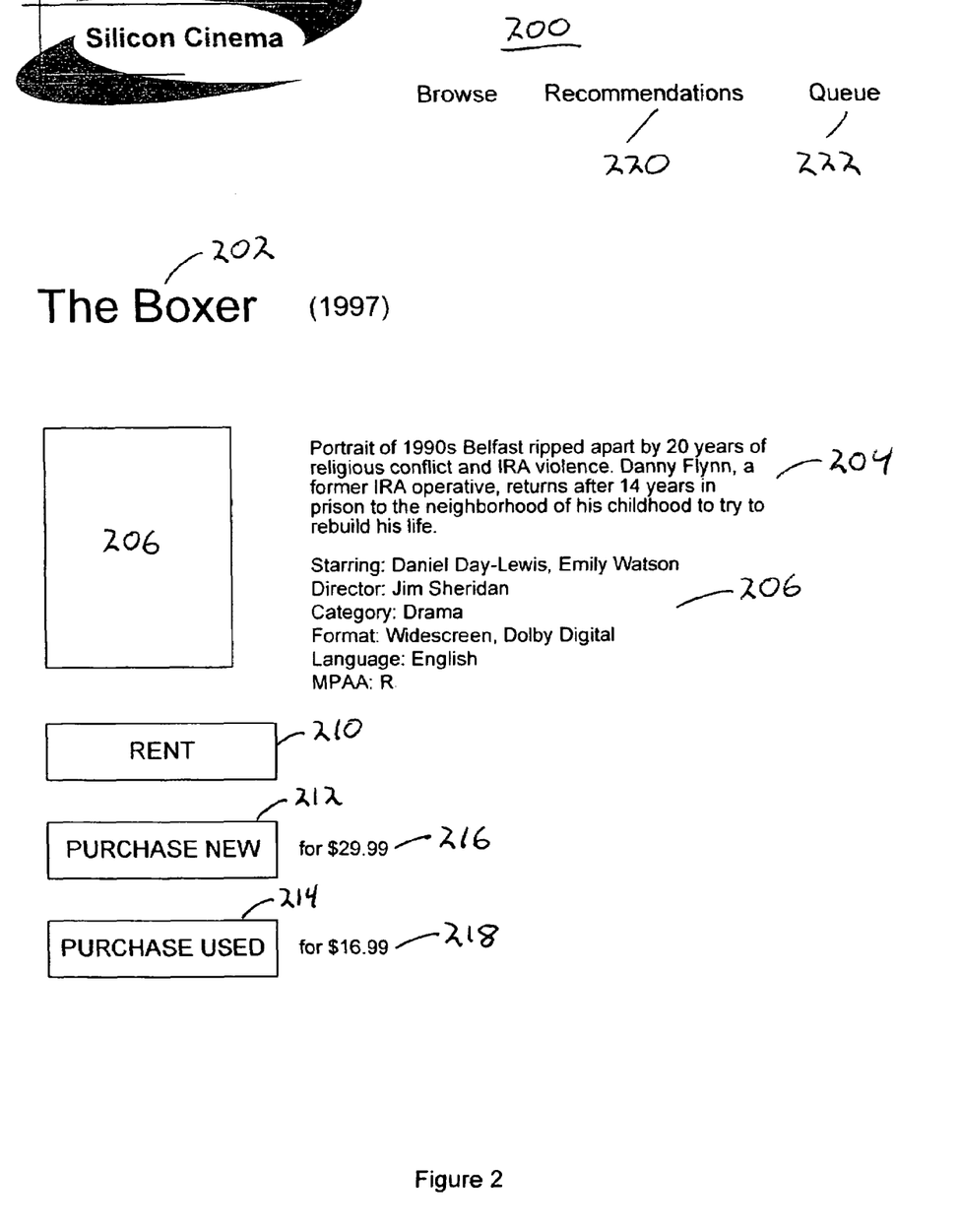
FIG. 2 illustrates the general form of a web page through which a user may select to rent or buy a given product.

FIG. 2 illustrates a DVD title web page through which a user may browse DVD titles and decide whether to rent the DVD or purchase the DVD. The web page 200 includes a DVD title 202, a plot description 204, a DVD cover image 206, and general information 208 including information such as starring actors, director, and category. The web page 200 includes a rent command 210 which the user selects if he would like to rent the DVD. If the user selects the rent command 210, the DVD title is placed on the user's rental queue. The web page 200 further includes a purchase new command 212 and purchase used command 214 which the user selects if he or she would like to purchase rather than rent the DVD. Web page 200 displays a new purchase price 216 and a used purchase price 218. The user may select to view recommendations 220 or his or her rental queue 222 at any time.

New purchase price 216 is set at MSRP or a sale price as determined by a sales manager operator of the web site. Used purchase price 218 is calculated in the same manner as described in reference to FIG. 5B above.

Figure 3A:
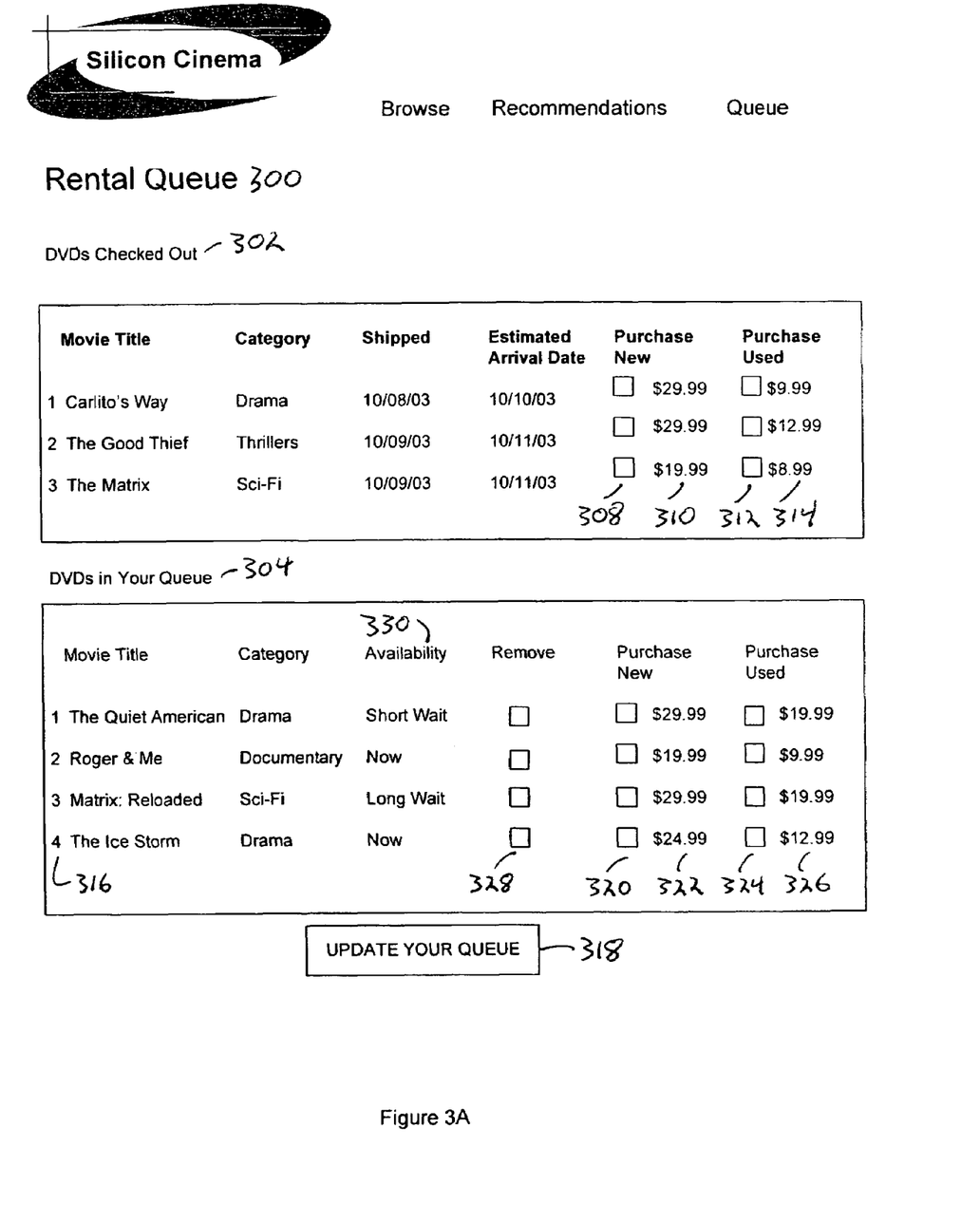
FIG. 3 illustrates the general form of a web page through which a user may select to purchase a product on the user's rental queue.
Figure 3B:
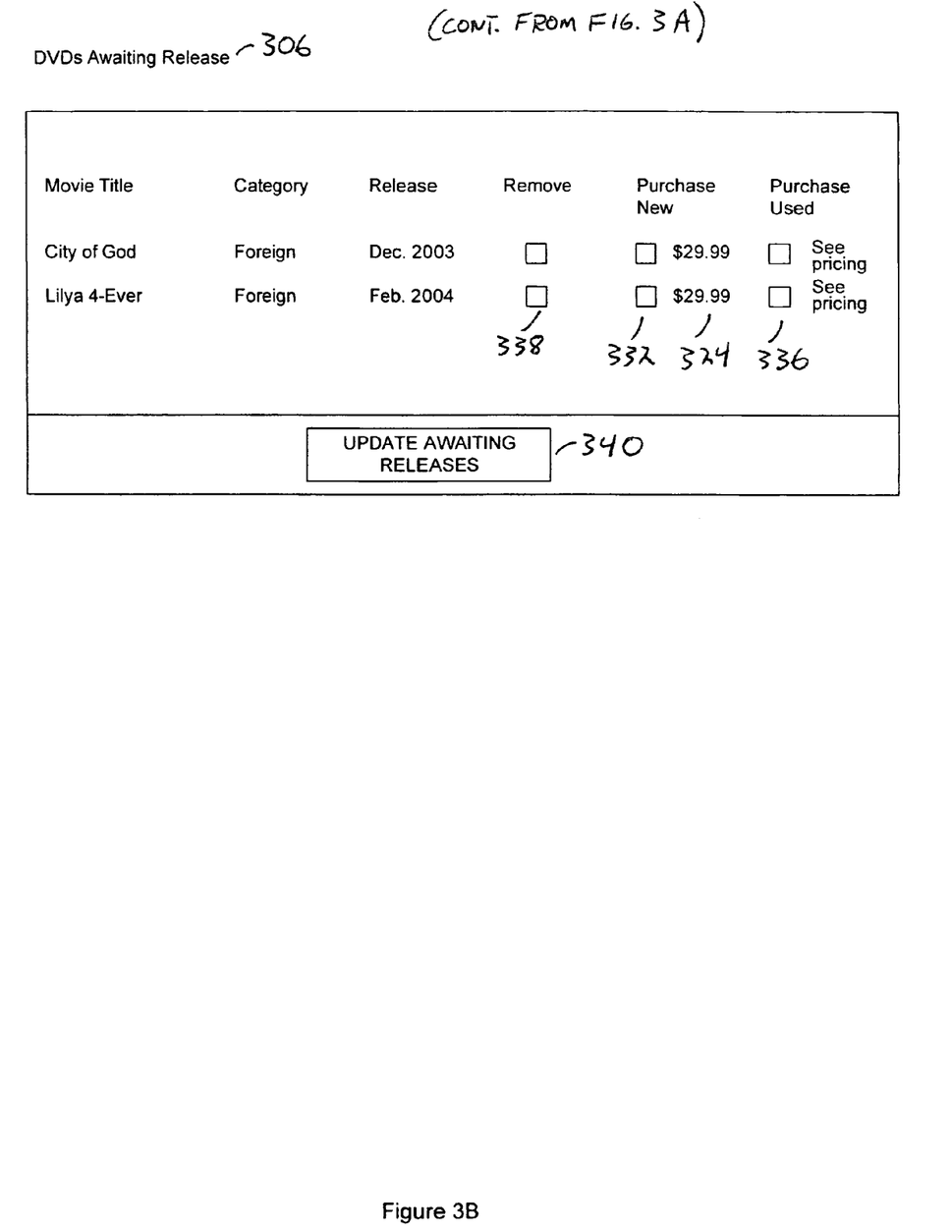

FIGS. 3A and 3B illustrate a rental queue web page 300 through which a user may view and modify his or her rental queue. The rental queue is divided into a DVDs checked out list 302, DVDs in queue list 304, and DVDs awaiting release list 306.

The DVDs checked out list 302 contains an ordered list of DVD titles that have been shipped to the user and are in transit, currently in the possession of the user, or have been shipped by the user and are in transit. For each DVD title, the Movie Title, Category, Shipped Date, and Estimated Arrival Date is provided. In other embodiments, the MPAA rating and user ratings may be displayed. In addition, for each DVD title in the list, a Purchase New check box 308 is provided and the new copy Purchase Price 310 is provided. A Purchase Used check box 312 and used Copy Purchase Price 314 is displayed. A user selects to purchase a used or new copy of the DVD title by selecting the Purchase Used check box 312 or Purchase New check box 308. If a user selects Purchase Used check box 312, the web site sends web page 400 to the user. If a user is selecting to purchase a used DVD title from the checked out list 302, the DVD will typically already be in possession of the user. The inventive service thus advantageously addresses a scenario where a user views a DVD title, and then decides that he wishes to purchase and own the DVD. Furthermore, the web site advantageously allows a user to purchase items previously browsed and placed on the rental queue. The rental queue may serve as a reminder list of the user's desired movies for potential purchase.

Figure 4:
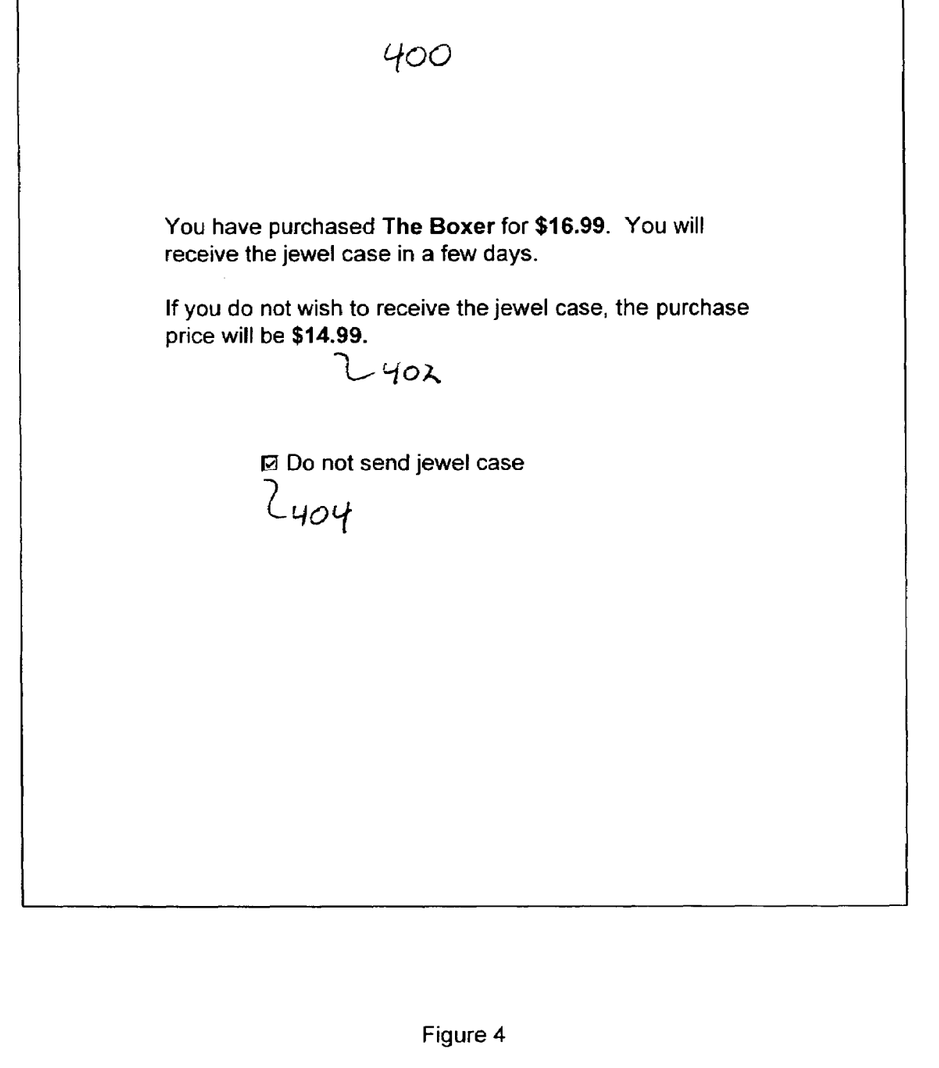
FIG. 4 illustrates the general form of a web page though which a user selects whether to receive a product case when purchasing a product already in possession, and presents a modified purchase price.

FIG. 4 illustrates a web page 400 through which a user may select not to receive the DVD title jewel case. Web page 400 displays a discounted purchase price 402 if the user selects a "Do Not Send Case" check box 404. In an embodiment of the invention, the discounted purchase price is a reduced price based on reduced handling, processing, and shipping charges.

The DVDs in queue list 304 contains an ordered list of DVD titles that a user has selected to place on the rental queue and are awaiting shipment to the user when a DVD on the user's checked out list 302 is returned. The DVD's are ordered based on temporal selection by the user. DVD titles selected by the user are placed at the bottom of the rental queue. A user may modify the priority 316 of a DVD title at any time by re-ordering the priority and selecting the Update Your Queue 318 command button. DVD titles with the highest priority are shipped to the user when a DVD is returned. For each DVD title, the Movie Title, Category, and Availability 330. Availability 330 options include Long Wait, Short Wait, and available Now. In addition, a Purchase New check box 320 is provided and the new copy Purchase Price 322 is provided. A Purchase Used check box 324 and used copy Purchase Price 326 is displayed. A user selects to purchase a used or new copy of the DVD title by selecting the Purchase Used check box 324 or Purchase New check box 320. A remove DVD check box 328 is provided for the user to select if the user desires to remove a DVD title from queue list 304.

The DVDs awaiting release list 306 contains an ordered list of DVD titles that a user has selected to place on the rental queue that are not yet available and are awaiting release. A user may select the Update Awaiting Releases command button 340 upon making any changes to the awaiting release list 306. DVD titles are placed at the bottom of the queue list 304 when they become available. For each DVD title, the Movie Title, Category, and Estimated Release Date. In addition, a Purchase New check box 332 is provided and the new copy Purchase Price 334 is provided. A user selects to purchase a new copy of the DVD title by selecting the Purchase Used check box 336 or Purchase New check box 332. A remove DVD check box 338 is provided for the user to select if the user desires to remove a DVD title from the awaiting release list 306. If a user selects the Purchase Used check box 336, the web site sends a web page 700 to the user.

The present invention may be used to rent and sell downloadable items such as books, games, and music through a web site. In this embodiment, the web site of the present invention includes functionality for allowing users to search, browse, rent, and purchase from an online catalog of music content in MP3 or comparable digital format. Users may select to download selected music either as a rental or purchase. Music downloaded as a rental appear in the user's rental queue. The rental queue is maintained over multiple browsing sessions. If the user selects to download music as a rental, the downloaded digital content has use limitation mechanisms. For example, music downloaded as a rental may "expire" after a predetermined time period or predetermined number of uses. The downloaded content may have copy restrictions. After the pre-determined period the rented music may no longer be playable or may delete itself. A variety of tools may be used to expire the rented music. If a user selects to purchase music, no such expiration will apply.

In operation, a user browses through the web site viewing profiles of music which is available for download. The profiles may include descriptors such as song title, artist, category of music, and album title. The web site may offer a variety of features that enable the user to identify desired song or album titles. The web site may identify other songs or albums rented by other users who also rented the music the user is currently browsing. Additional features as applied to music are similar to the embodiments described above.

The user may select to "rent" selected songs or albums, which will result in the selected songs or albums being downloaded to the user's computer. The rented songs or albums are then placed in the user's queue. The user may view his or her queue at any time. The use may rent as many songs or albums as desired. The user pays a rental fee for each song. In an embodiment of the invention, the rental fee is a price that is low enough to encourage the user to rent the music. The rental price may be set low enough to discourage users from downloading the music for free from file sharing networks or other systems in violation of copyright law. Thus, the inventive system provides users with a desirable alternative to unlawful behavior. The rental price may be set based on consumer surveys, experimentation (modifying rental price points on the web site and tracking results), or other means. Although the rental price is lower than the purchase price, the user will be utilizing the web site rather than free file sharing networks, thereby generating revenue and building a library of users which may be solicited to purchase the music. The invention may advantageously be utilized in contexts where a user may only wish to rent items for a brief period of time. For example, a user with a wireless cellular phone with an Internet browser and MP3 player may wish to select and download music while traveling or away from home.

The web site implements a sales service which operates in accordance with the invention to sell downloadable music. The sales service is used to sell content which has been rented (previously downloaded) and content which has not been rented. In an embodiment of the invention, the web site generates a purchase price for various rented content which is designed to encourage user purchases. For example, the purchase price accounts for the fact that the user has paid a rental fee to download the music and adjusts the purchase price by a corresponding amount. The user may also be given an option to renew a rental for an additional rental fee. If the user opts to renew the rental for an additional rental fee, the subsequent purchase price is reduced by the additional rental fee.

The purchase price and rental price for songs or albums may be set in a variety of ways. Because of the unique context of unlawful free file sharing of downloadable music, pricing may be based on other factors as well. For example, the price that a user may be willing to pay to rent or purchase a song rather than download it for free may be determined through experimentation or surveys. The present web site advantageously allows users to first rent songs or albums. Because rental rates are lower than purchase prices, a price point is reached where users are will be willing to pay the low rental rates rather than behave in an unlawful manner. Many listeners of downloadable music may wish to only listen to the downloaded content for a limited period or use. The web site advantageously encourages users to purchase music which has been previously downloaded. Because the music has already been downloaded, to purchase the rented songs or albums, users need not take the time and effort to download the music again to make a purchase.

The web site thus allows users to try songs or music they might otherwise be hesitant about purchasing. In an embodiment of the invention, the purchase price is reduced when the user rents or re-rents a song or album. The web site thereby advantageously allows the user to have effectively rented the music for free if they ultimately decide to purchase the music. The web site has already transferred the music to the user, so no additional bandwidth is required when a user purchases previously rented music. The web site generates revenue through both rental and sale of downloadable digital content while soliciting users away from unlawful free file sharing. Although users may choose to initially rent songs, the web site advantageously generates revenue by encouraging a high quantity of rentals via low pricing and then encouraging re-rentals and subsequent purchase of rented items. In other embodiments, the purchase price may be set at an MSRP or based on an evaluation of prices at other online providers.

Although the purchase price for songs or albums may be fixed across all songs and albums, in a further embodiment of the invention, the rental and purchase prices are determined by identifying a baseline purchase price and applying weighted price modification factors to calculate the rental and purchase price. For example, a frequent buyer or renter discount may be applied.

Figure 8:
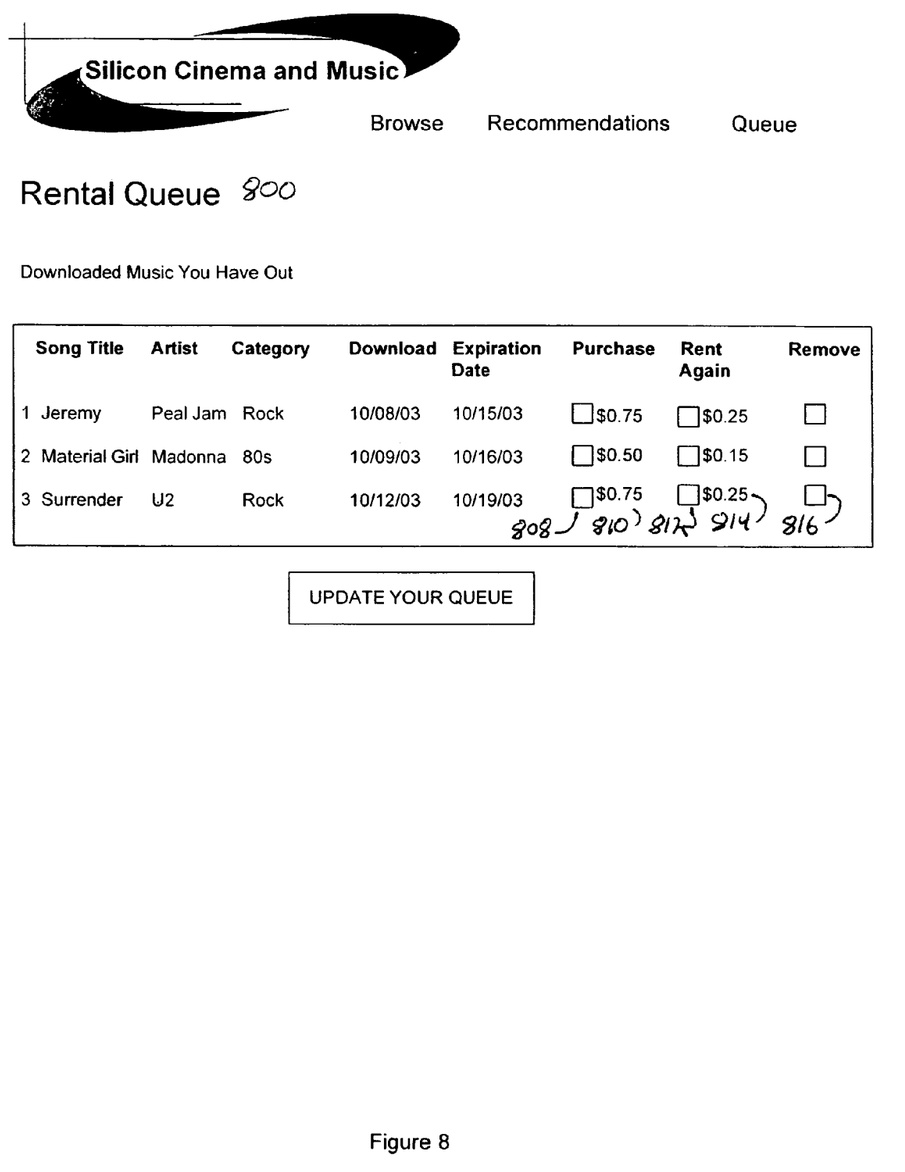
FIG. 8 illustrates the general form of a web page in a downloadable music embodiment through which a user may select to purchase rented downloaded content on the user's rental queue.

FIG. 8 illustrates the general form of a web page in a downloadable music embodiment through which a user may select to purchase rented downloaded content on the user's rental queue. The rental queue 800 contains a list of song titles or albums that have been rented and downloaded by the user. For each song title or album, the artist, category, download date, and expiration date is provided. In other embodiments, additional descriptors such as file size and quality in Kbps may be displayed. In addition, for each song or album in the list, a Purchase check box 808 is provided and the Purchase Price 810 is provided. A Rent Again check box 812 and used Rent Again Price 814 is displayed. A user selects to purchase the rented song by selecting the Purchase check box 808. If a user selects the Purchase check box 808, the web site sends a file update which eliminates the expiration date of the song file. In a further embodiment of the invention, the web site may download an unrestricted song file to the user. The inventive web site thus advantageously addresses a scenario where a user rents a song or album for a rental fee, and then decides that he wishes to purchase and own the song or album. The user may select the Rent Again check box 812 if the user still does not wish to purchase the song, but wishes the expiration date to be extended. If the user wishes to remove a song from the rental queue, the user may select a Remove check box 816.

Although this invention has been described in terms of certain preferred embodiments, other embodiments that are apparent to those of ordinary skill in the art are also within the scope of this invention. For example, although the embodiments described herein employ item lists, other programming methods for keeping track of items can be used. Accordingly, the scope of the present invention is intended to be defined only by reference to the appended claims.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A computer implemented method for managing inventory of a disk rental system comprising:
    generating a user queue data structure comprising:
        a list of ordered disk identifiers associated with user selected disks;
        a status identifier for each disk identifier, the status identifiers including a checked out status, available status, and unavailable status;
    maintaining a database of user queue data structures corresponding to a plurality of users;
    generating an optimized purchase price for a disk identifier with a checked out status comprising searching the database of user queue data structures to identify the frequency of appearance of the disk identifier in all user queue data structures; and
    storing the optimized purchase price in the user queue data structure and displaying the optimized purchase price to the user.

2. The method of claim 1, further comprising:
    receiving a user request to purchase a disk identifier with a checked out status; and
    sending a query to the user determining whether the user wishes to receive additional packaging associated with the disk identifier.

3. The method of claim 1, further comprising generating and sending an email notification to a user containing an optimized purchase price for a disk with a checked out status identifier.

4. A computer readable storage medium storing instructions that when executed by a computer cause the computer to perform a method for managing inventory of a web-based disk rental system comprising, comprising:
    generating a user queue data structure comprising:
        a list of ordered disk identifiers associated with user selected disks; and
        a status identifier for each disk identifier, the status identifiers including a checked out status, available status, and unavailable status;
    maintaining a database of user queue data structures corresponding to a plurality of users;
    generating an optimized purchase price for a disk identifier with a checked out status comprising searching the database of user queue data structures to identify the frequency of appearance of the disk identifier in all user queue data structures; and
    storing the optimized purchase price in the user queue data structure and displaying the optimized purchase price to the user.

* * * * *